United States Patent
Ogawa

(10) Patent No.: US 9,039,139 B2
(45) Date of Patent: May 26, 2015

(54) TIRE PRINTING DEVICE AND METHOD FOR PRINTING ONTO TIRE SURFACE

(75) Inventor: Yuichiro Ogawa, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 14/004,000

(22) PCT Filed: Feb. 21, 2012

(86) PCT No.: PCT/JP2012/001166
§ 371 (c)(1),
(2), (4) Date: Sep. 9, 2013

(87) PCT Pub. No.: WO2012/120803
PCT Pub. Date: Sep. 13, 2012

(65) Prior Publication Data
US 2014/0022302 A1    Jan. 23, 2014

(30) Foreign Application Priority Data

Mar. 10, 2011    (JP) ................................ 2011-053279

(51) Int. Cl.
| | | |
|---|---|---|
| *B41J 2/15* | (2006.01) | |
| *B60C 13/00* | (2006.01) | |
| *B41J 3/407* | (2006.01) | |
| *B41J 25/308* | (2006.01) | |
| *B05B 13/04* | (2006.01) | |
| *B29D 30/72* | (2006.01) | |
| *B41M 5/00* | (2006.01) | |

(52) U.S. Cl.
CPC ............. *B60C 13/001* (2013.01); *B41J 3/4073* (2013.01); *B29D 2030/728* (2013.01); *B41J 25/308* (2013.01); *B05B 13/0415* (2013.01); *B05B 13/0442* (2013.01); *B41M 5/0047* (2013.01); *B41M 5/0064* (2013.01); *B41M 5/0088* (2013.01)

(58) Field of Classification Search
USPC .................................................. 347/2–5, 12
See application file for complete search history.

(56) References Cited

U.S. PATENT DOCUMENTS

| 4,308,747 A | 1/1982 | Reed |
|---|---|---|
| 5,905,199 A | 5/1999 | Scarpetti et al. |
| 6,510,996 B1 | 1/2003 | Lee et al. |
| 2001/0003871 A1 | 6/2001 | Patton et al. |
| 2006/0161381 A1 | 7/2006 | Jetter |
| 2008/0023124 A1 | 1/2008 | Lacagnina et al. |
| 2010/0024942 A1 | 2/2010 | Negroni et al. |

FOREIGN PATENT DOCUMENTS

| CA | 1 255 515 A | 6/1989 |
|---|---|---|
| JP | A-59-93343 | 5/1984 |
| JP | A-2006-111242 | 4/2006 |
| JP | A-2007-523760 | 8/2007 |
| JP | A-2010-125440 | 6/2010 |

OTHER PUBLICATIONS

International Search Report issued in International Patent Application No. PCT/JP2012/001166 mailed Apr. 24, 2012.
Extended European Search Report issued in European Application No. 12754592.9 mailed Jul. 21, 2014.
Dec. 3, 2014 Office Action issued in Chinese Application No. 201280011469.4 (with English translation.).
Nov. 25, 2014 Office Action in Japanese Patent Application No. 2011-053279.

*Primary Examiner* — Lamson Nguyen
(74) *Attorney, Agent, or Firm* — Oliff PLC

(57) ABSTRACT

The present invention aims to provide a technique that prints characters and patterns clearly onto a tire surface without complicated operations. A tire printing device of the present invention includes a printer head that ejects and applies a coating material onto a tire surface, a widthwise moving unit that moves the printer head along the width direction of the tire, a radial moving unit that moves the printer head along the radical direction of the tire, and a swinging unit that swings the printer head around the axis along the circumferential direction of the tire.

2 Claims, 3 Drawing Sheets

FIG. 2
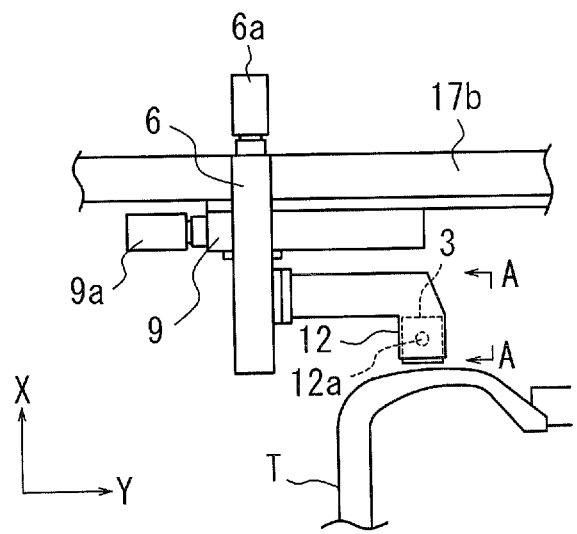
(a)
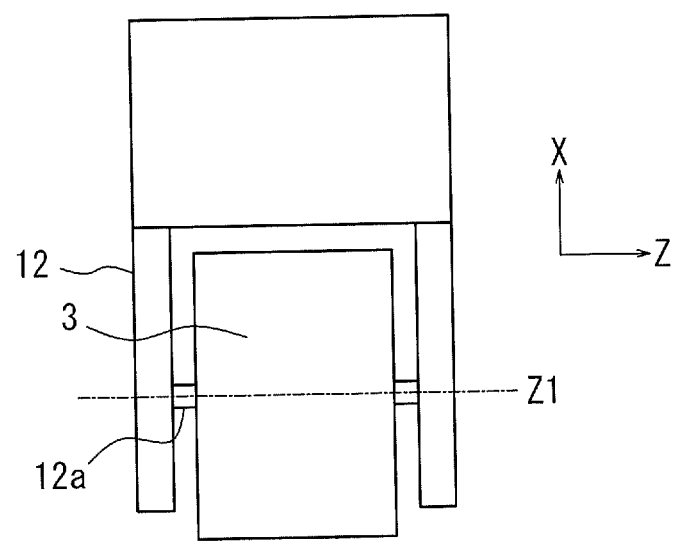
(b)

TIRE PRINTING DEVICE AND METHOD FOR PRINTING ONTO TIRE SURFACE

TECHNICAL FIELD

The present invention relates to a tire printing device and a method for printing characters, patterns or the like on a tire surface.

BACKGROUND ART

As a printing device for printing characters, patterns or the like on a tire surface, a swiveling type tire printer as disclosed in Patent Literature 1 is conventionally known. The swiveling type tire printer has a function of adjusting its center position, height, and turning radius according to the size of the tire fixed to a base, and prints characters and patterns while swiveling above a tire sidewall with a strut extending along the center of the tire as a rotational axis.

However, the tire sidewall is curved rather than flat, so that the position and posture of the printer head described in Patent Literature 1 with respect to the tire surface may differ depending on the position on the sidewall of the tire. In other words, as shown in FIG. 4, the distance between the sidewall of the tire T and a printer head 103 becomes minimum at a maximum width position on the sidewall, and becomes larger as further away from the maximum width position of the sidewall. Therefore, at the position where the distance between the tire side surface T and the printer head 103 becomes excessively large, the ink ejected from the printer head 103 is diffused to make characters, patterns or the like blurry. In addition, since the printer described in Patent Literature 1 swivels the printer head along the sidewall, the radius of swivel and the height of the printer described in Patent Literature 1 need to be adjusted each time when the tire size is changed. The operations thus become complicated.

These problems can be solved by using an ink-jet head to perform the printing on a rotating tire while the sidewall is pressed by a roller to flatten the surface to be printed as described in Patent Literature 2. However, after the printing is performed under a state that the sidewall is pressed by a roller to flatten the surface to be printed, and when an internal pressure is applied to the tire and the tire side wall becomes curved (e.g. when the tire is used), the characters and patterns are stretched. As a result, the characters and patterns become distorted which impairs the appearance. In addition, since the sidewall must be pressed evenly by the roller according to the technique described in Patent Literature 2, the operations are complicated.

CITATION LIST

Patent Literature

PTL 1: JP2006111242
PTL 2: JP2010125440

SUMMARY OF INVENTION

Therefore, in order to solve the above mentioned problems, the purpose of the present invention is to provide a tire printing device and a tire surface printing method that are capable of printing characters, patterns or the like clearly onto a tire surface without complicated operations.

The present invention is intended to address the above-mentioned problems. The tire printing device of the present invention includes a printer head that ejects and applies a coating material onto a tire surface, a widthwise moving unit that moves the printer head along a width direction of the tire, a radial moving unit that moves the printer head along a radial direction of the tire, and a swinging unit that swings the printer head around an axis along a circumferential direction of the tire.

The tire printing device of the present invention preferably contains a plurality of printer heads.

In order to solve the above mentioned problems, a method for printing onto a tire surface of the present invention ejects and applies a coating material from a printer head to the rotating tire surface, wherein during the printing, the printer head is swung around an axis along a circumferential direction of the tire while the printer head is moved along a width direction and the radial direction of the tire so as to maintain a constant distance and posture of the printer head with respect to the tire surface.

In addition, according to the method for printing onto a tire surface of the present invention, the distance and posture of the printer head with respect to the tire surface is preferably controlled by a program.

In addition, according to the method for printing onto a tire surface of the present invention, the printing onto the tire surface by the printer head is preferably performed under a state that the tire is mounted on a rim and an internal pressure is applied to the tire mounted on the rim.

According to the tire printing device and tire surface printing method of the present invention, during the printing, the printer head is swung around the axis along the circumferential direction of the tire while the printer head is moved along the width direction and the radial direction of the tire so as to maintain an appropriate distance and posture of the printer head with respect to the tire surface. Therefore, the coating material ejected from the printer head can be applied onto the tire surface without being diffused. As a result, not only the characters and patterns can be printed clearly without blurring but also cumbersome operations in the prior art, such as flattening the tire surface with the pressing roller, can be eliminated.

BRIEF DESCRIPTION OF DRAWINGS

FIG. 2 (a) illustrates a partially enlarged view of the tire printing device of FIG. 1.

FIG. 2 (b) is a side view as viewed from the arrow A-A in FIG. 2 (a).

DESCRIPTION OF EMBODIMENTS

Figure 1:
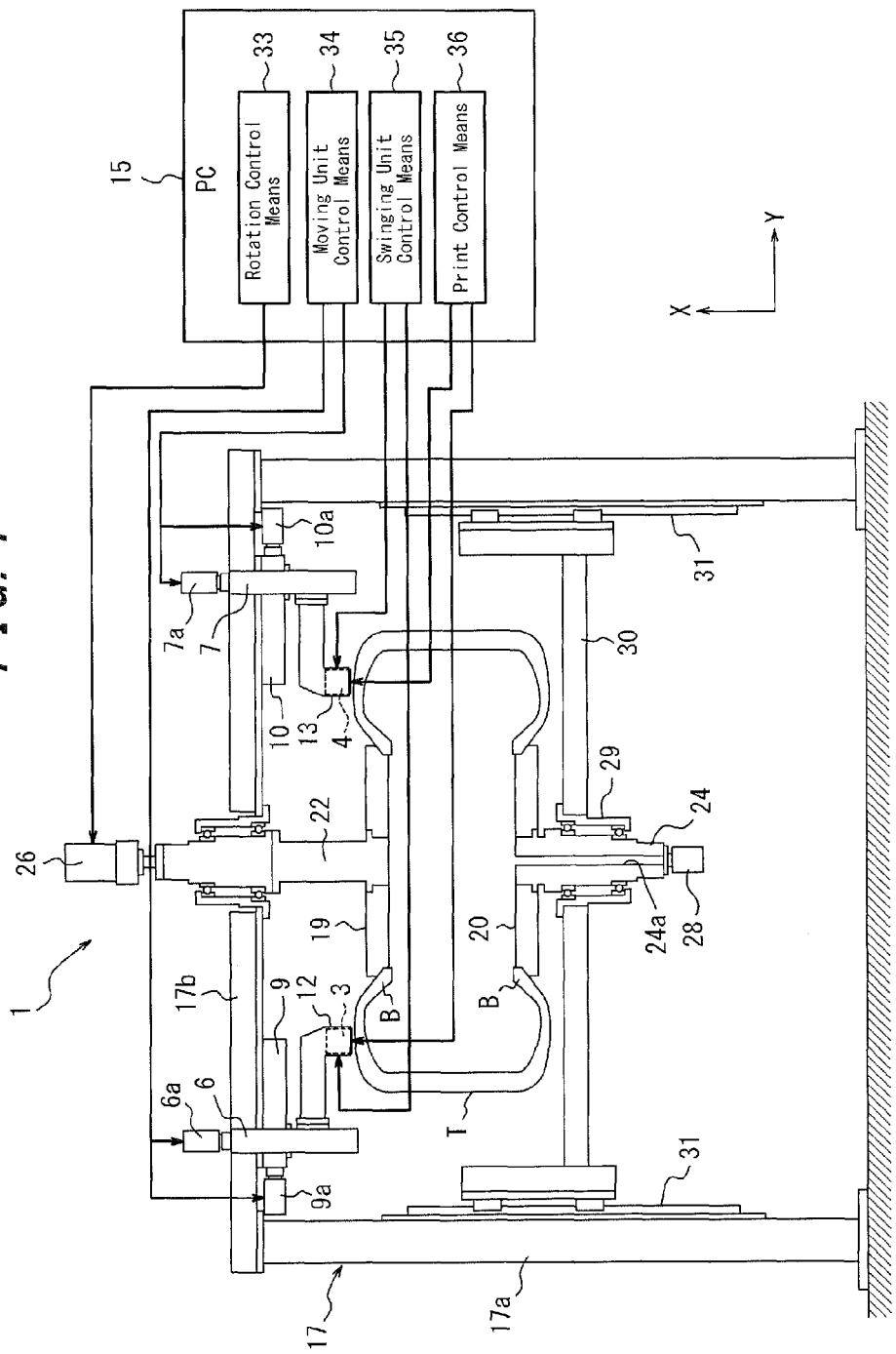
FIG. 1 is a schematic diagram of a tire printing device that performs a method for printing onto a tire surface according to embodiments of the present invention.

Embodiments of the present invention are described below with reference to the drawings. FIG. 1 is a schematic diagram of a tire surface printing device that performs a method for printing onto a tire surface according to one embodiment. FIG. 2 (a) illustrates a partially enlarged view of the tire surface printing device of FIG. 1. FIG. 2 (b) is a side view as viewed from the arrow A-A in FIG. 2 (a). In FIG. 2 (b), the symbol X refers to a width direction of the tire to be printed onto, the symbol Y refers to a radial direction of the tire, the symbol Z refers to a circumferential direction of the tire, and the symbol Z1 refers to an axis line along the circumferential direction Z.

The tire printing device shown in FIG. 1 includes at least one (two in the illustrated embodiment) printer heads 3, 4 that eject and apply the coating material onto a tire surface (side wall), widthwise moving units 6, 7 that move the printer heads 3, 4 along the axis direction (width direction) X of the tire T, radial moving units 9, 10 in conjunction with the widthwise moving units 6, 7 that move the printer heads 3, 4 along the radial direction Y of the tire T, and swinging units 12, 13 that swing the printer heads 3, 4 around the axis line Z1 extending along the circumferential direction Z of the tire T.

The printer heads 3, 4 are an inkjet type, but may also be an air spray type, or an airless spray type. Furthermore, as shown in this embodiment, when multi-color printing is performed under simultaneous rotations, a plurality of printer heads 3, 4 may be arranged depending on the number of applying colors.

The widthwise moving units 6, 7 and the radial direction moving units 9, 10 utilize a feed screw mechanism in this embodiment. Particularly, the feed screw mechanism includes ball screws (not shown in the figures), servo motors 6a, 7a, 9a, 10a that rotate the ball screws, sliders (not shown in the figures) that are screwed together with the ball screws to move printer head 3, 4, and position detectors (not shown in the figures). The displacements of the servo motors 6a, 7a, 9a, 10a are detected by the position detectors, and the detected positions are transmitted to a PC (personal computer) 15 which acts as a control device. It should be noted that as far as the widthwise moving units 6, 7 and the radial direction moving units 9, 10 are capable of moving the printer heads 3, 4 in the width direction X and the radial direction Y, the movement mechanisms of the moving units are not particularly limited. For example, instead of the feed screw mechanism, a hydraulic cylinder may be utilized to move the printer heads 3, 4. The radial moving units 9, 10 are supported by a beam unit 17b of a frame 17 formed with a pillar unit 17a and the beam unit 17b. The widthwise moving units 6, 7 are supported by the slider of the radial moving units 9, 10 so that the widthwise moving units 6, 7 are movable in the radial direction Y.

The swinging unit 12 representing the swinging units 12, 13 in FIG. 2 (a) and FIG. 2 (b) includes a swinging shaft 12a connected to the printer head 3, the servo motor, in cooperation with the printer head 3, for swinging the swinging shaft 12a around the axis Z1, and a swinging angle detector (not shown in the figures) for detecting a swinging angle of the swinging shaft 12a. The swinging angle detected by the swinging angle detector is transmitted to the PC 15. It should be noted that instead of the servo motor, a hydraulic cylinder, a piezoelectric element or the like may be utilized to swing the printer heads 3, 4 around the axis Z1.

In addition, the tire printing device 1 includes an upper rim 19 and a lower rim 20 both are fitted to bead portions B of the tire T to hold the tire T, a tire rotation main shaft 22 connected to the upper rim 19, a slave shaft 24 connected to the lower rim, a rotation main shaft-driving device 26 that rotates the tire rotation main shaft 22. The tire T on the tire printing device 1 is rotated by the tire rotation main shaft 22. In addition, an inside of the slave shaft 24 is formed with an air inlet 28 for compressed air provided at the lower end of the slave shaft 24 and a communication passage 24a that communicates with the interior of the tire. In other words, the tire printing device 1 is configured to be capable of letting air in and out to the inside of the tire through the communication passage 24a. In addition, the reference numeral 29 in FIG. 1 denotes a shaft bearing that supports the slave shaft 24, the reference numeral 30 denotes an elevator unit that moves along a rail 31 provided on the pillar unit 17a of the frame 17 and that moves the shaft bearing 29 and the slave shaft 24 up and down.

The PC 15 is provided with a rotation control means 33, a moving unit control means 34, a swinging unit control means 35 and a print control means 36. The rotation control means 33 is connected to the rotation main shaft-driving device 26 and controls the rotation main shaft-driving device 26 so that the tire T rotates at a constant velocity. The moving unit control means 34 is connected to the widthwise moving units 6, 7 and radial moving units 9, 10 and respectively controls the widthwise moving units 6, 7 and radial moving units 9, 10 so that the printer heads 3, 4 are positioned at predetermined positions on the tire side wall. The swinging unit control means 35 is connected to the swinging units 12, 13 and controls the swinging units 12, 13 so that the printer heads 3, 4 are positioned at predetermined angles (substantially parallel) with respect to the curved surface of the tire side wall. The print control means 36 is connected to the printer heads 3, 4 and outputs print control signals and print data signals to the printer heads 3, 4.

It should be noted that the functions of each of the rotation control means 33, the moving unit control means 34, the swinging unit control means 35 and the print control means 36 are realized by executing a software (program) stored in the PC 15. The information regarding the shape of the tire T may be input into the PC 15 in advance or data read by a scanner provided for scanning the outline of the tire side wall (curved surface) may be input into the PC 15.

A method for printing characters and patterns onto a surface (side wall surface) of the tire T by using the tire printing device 1 of the present embodiment is described as follows. First, a vulcanized tire T is mounted onto an upper rim 19 and a lower rim 20 (rim mount process); the tire T mounted on the rims is installed onto the tire printing device 1 (tire installation process); and an internal pressure is applied into the tire T through an air inlet 28 to inflate the tire T (tire inflation process). At this time, there is no particular limitation for the internal pressure to be filled into the tire T. However, in order to have the curvature of the tire side wall during printing be equivalent to the curvature of the tire side wall when the tire is in use, a regular internal pressure is preferred. The regular internal pressure refers to "the maximum air pressure" as defined by JATMA, the maximum value of TIRE LOAD LIMITS AT VARIOUS COLD INFLATION PRESSURES as defined by TRA, or the INFLATION PRESSURES as defined by ETRTO.

Next, the rotation main shaft 22 is driven through the rotation main shaft-driving device 26 to rotate the tire T (tire rotation process). Next, the widthwise moving units 6, 7 and radial moving units 9, 10 are driven to move the printer heads 3, 4 along the tire width direction X and the tire radial direction Y, thereby positioning the printer heads 3, 4 onto the predetermined positions on the side wall of the tire T, and the swinging units 12, 13 are driven to adjust the distance and posture of the printer heads 3, 4 with respect to the side surface of the tire T to be constant (printer heads position and posture adjustment process). Next, the coating material are ejected and applied from the printer heads 3, 4 onto the side wall of the rotating tire T while maintaining the distance and posture of the printer heads 3, 4 to be constant with respect to the side wall of the tire T to draw (print) desired characters, patterns, symbols, designs (predetermined patterns) or the like (print process). The coating material applied on the side wall of the tire T is dried and hardened by UV lamps (not shown in figures) placed adjacent to the printer heads 3, 4 (dry process). It should be noted that the above mentioned tire rotation process can be reversed with the printer heads position and posture adjustment process in order.

Figure 3:
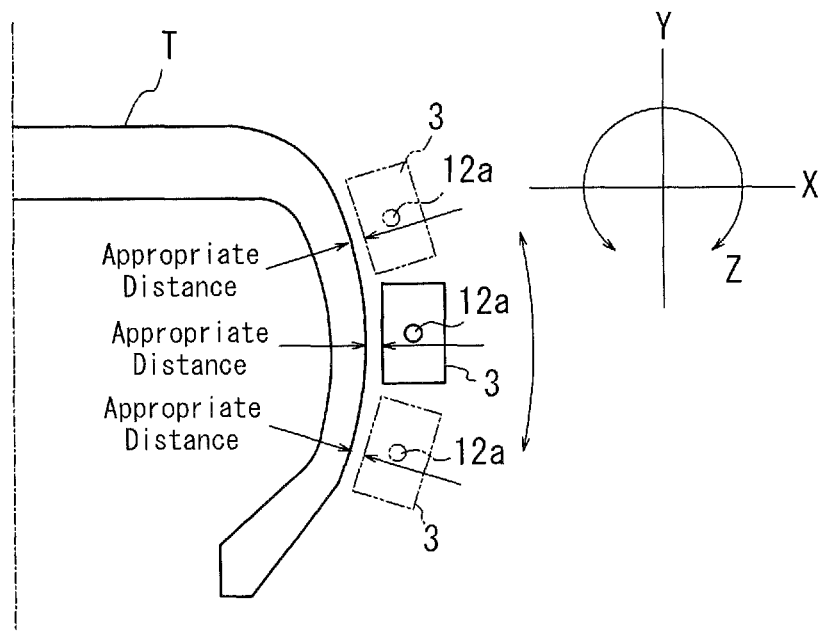
FIG. 3 illustrates a schematic diagram showing the position and posture of the printer head with respect to the tire surface when the tire printing device of FIG. 1 prints onto the side wall of the tire.
Figure 4:
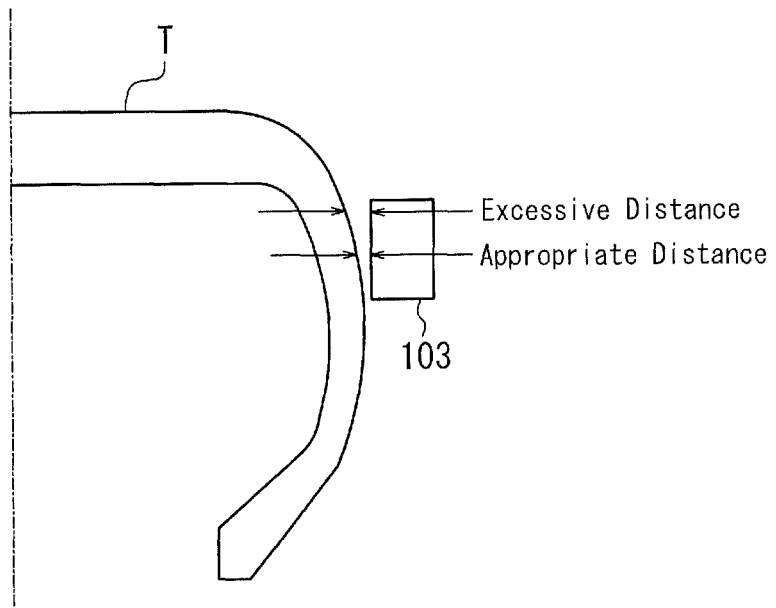
FIG. 4 illustrates a schematic diagram showing a position and posture of the printer head with respect to the tire surface when a conventional tire printing device prints onto the side wall of the tire.

Therefore, according to the tire surface printing device 1 and the method for tire surface printing, the printer heads 3, 4 placed near the rotating tire T are swung around the axis Z1 along the circumferential direction Z of the tire T while the printer heads 3, 4 are moved along the width direction X and the radial direction Y of the tire T during the printing, so that, as shown in FIG. 3, the constant (appropriate) distance and posture of the printer heads 3, 4 with respect to the tire T side surface can be maintained. Thereby, the coating material ejected from the printing heads 3, 4 can be applied on the side wall of the tire T without being diffused. As a result, characters, patterns or the like can be printed clearly without blurring. In addition, the cumbersome operations involved in the prior art, such as flattening the surface to be printed by pressing the side wall of the tire T with a roller can be eliminated.

In addition, the tire surface printing device 1 and the method for tire surface printing of the present embodiment have a plurality sets of printer heads 3, 4, so that multi-color printing may be performed under simultaneous rotations.

According to the tire surface printing device 1 and the method for tire surface printing of the present embodiment, the distance and the posture of the printer heads 3, 4 with respect to the side wall of the tire T are controlled by a program, which allows characters, patterns or the like to be printed automatically onto a predetermined position on the side wall of the tire T after the tire T is installed onto the tire printing device 1.

In addition, according to the tire surface printing device 1 and the method for tire surface printing of the present embodiment, since the printing onto the side wall of the tire T by the printer heads 3, 4 is performed under the state that the tire T is mounted on the rims and filled with the internal pressure, the tire T can be maintained with a constant shape during printing. As a result, the printing of the characters, the patterns or the like onto the curved surface on the side wall of the tire T can be performed without any wrinkles and blurring. Furthermore, since the printing is performed under a state that the tire T is filled with the internal pressure, the curvature of the side wall of the tire T during printing can be approximated with the curvature of the side wall of the tire T when in use (when the tire T is mounted onto a regular rim and filled with a regular internal pressure). Therefore, the appearance of the visible characters, patterns or the like can be improved when the tire is in use. From this viewpoint, the printing is preferably performed when the tire T is filled with the regular internal pressure.

The foregoing has described with reference to the illustrated examples. However, the present invention is not limited to the embodiments described above. The present invention can be modified accordingly within the scope of the appended claims. For example, in the above mentioned embodiments, a pneumatic tire is used as the tire to be printed onto, however, the present invention can also be applied onto a solid tire. In the above mentioned embodiments, two printer heads have been shown by way of example, however, one printer head or three or more printer heads may be provided. In addition, the internal pressure may be lower than the regular internal pressure when the printing is performed with an internal pressure filled inside the tire.

In conclusion, it is possible to provide a tire surface printing device and a method for printing onto a tire surface that are capable of printing the characters, patterns or the like clearly onto the tire surface without cumbersome operations.

REFERENCE SIGNS LIST

1: Tire surface printing device
3, 4: Printer head
6, 7: Widthwise moving units
9, 10: Radial moving units
12, 13: Swinging units
12a: Swinging shaft
15: PC
17: Frame
19: Upper rim
20: Lower rim
26: Rotation main shaft-driving device
28: Air inlet
T: Tire to be printed

The invention claimed is:

1. A method for printing onto a tire surface by ejecting and applying a coating material from a printer head to the rotating tire surface, wherein
    during the printing, the printer head is swung around an axis along a circumferential direction of the tire while the printer head is moved along a width direction and the radial direction of the tire so as to maintain a constant distance and posture of the printer head with respect to the tire surface,
    wherein the printing onto the tire surface by the printer head is performed under a state that the tire is mounted on a rim and an internal pressure is applied to the tire mounted on the rim.

2. The method for printing onto a tire surface according to claim 1, wherein the distance and posture of the printer head with respect to the tire surface is controlled by a program.

* * * * *